(12) United States Patent
Wang et al.

(10) Patent No.: US 9,014,901 B2
(45) Date of Patent: Apr. 21, 2015

(54) SYSTEM AND METHOD FOR TRAJECTORY CONTROL OF A TRANSPORT VEHICLE USED WITH A HARVESTER

(75) Inventors: Guoping Wang, Naperville, IL (US);
Riccardo Morselli, Modena (IT);
Olivier Vanhercke, Gistel (BE);
Christopher Foster, Denver, PA (US)

(73) Assignee: CNH Industrial America LLC, New Holland, PA (US)

( * ) Notice: Subject to any disclaimer, the term of this patent is extended or adjusted under 35 U.S.C. 154(b) by 54 days.

(21) Appl. No.: 13/883,677

(22) PCT Filed: Nov. 30, 2011

(86) PCT No.: PCT/US2011/062493
§ 371 (c)(1),
(2), (4) Date: May 6, 2013

(87) PCT Pub. No.: WO2012/112205
PCT Pub. Date: Aug. 23, 2012

(65) Prior Publication Data
US 2013/0231823 A1  Sep. 5, 2013

Related U.S. Application Data

(60) Provisional application No. 61/444,495, filed on Feb. 18, 2011.

(51) Int. Cl.
*G01C 22/00* (2006.01)
*G05D 1/02* (2006.01)
*A01B 69/04* (2006.01)
*A01D 41/127* (2006.01)
(Continued)

(52) U.S. Cl.
CPC ............ *G05D 1/0212* (2013.01); *A01B 69/008* (2013.01); *A01D 41/127* (2013.01); *A01D 43/085* (2013.01); *A01D 43/086* (2013.01); *B62D 1/00* (2013.01); *B62D 12/02* (2013.01); *G05D 1/0274* (2013.01); *G05D 1/0278* (2013.01); *G05D 1/0293* (2013.01); *G05D 2201/0201* (2013.01); *A01D 43/073* (2013.01); *G06F 19/00* (2013.01)

(58) Field of Classification Search
CPC ......... G01C 21/00; G01C 22/00; G01C 23/00
USPC ............ 701/1, 2, 23, 24, 32.3, 32.4, 50, 408, 701/412, 468, 531
See application file for complete search history.

(56) References Cited

U.S. PATENT DOCUMENTS 6,148,255 A    11/2000  Van der Lely
6,216,071 B1 *  4/2001  Motz .............................. 701/50

(Continued)

FOREIGN PATENT DOCUMENTS

EP        2 044 826 A2    4/2009
EP        2 098 936 A1    9/2009
WO        03/019430 A1    3/2003

*Primary Examiner* — Kim T Nguyen
(74) *Attorney, Agent, or Firm* — Rebecca L. Henkel

(57) ABSTRACT

A control system and method is provided to control the trajectory of a transport vehicle (20) to follow the trajectory of a harvester (10). The harvester can send control information such as the harvester's current position and future position waypoints to the transport vehicle. The control system can then use the information from the harvester to determine the trajectory for the transport vehicle.

20 Claims, 4 Drawing Sheets

(51) Int. Cl.
   *A01D 43/08*    (2006.01)
   *B62D 1/00*     (2006.01)
   *B62D 12/02*    (2006.01)
   *A01D 43/073*   (2006.01)
   *G06F 19/00*    (2011.01)

(56) References Cited

U.S. PATENT DOCUMENTS

| | | |
|---|---|---|
| 6,301,530 B1 | 10/2001 | Tamura |
| 6,313,758 B1 | 11/2001 | Kobayashi |
| 6,587,772 B2 | 7/2003 | Behnke |
| 6,640,164 B1 | 10/2003 | Farwell et al. |
| 6,675,074 B2 | 1/2004 | Hathout et al. |
| 6,682,416 B2 | 1/2004 | Behnke et al. |
| 6,732,024 B2 | 5/2004 | Wilhelm Rekow et al. |
| 7,063,614 B2 | 6/2006 | Vogelgesang et al. |
| 7,209,822 B2 | 4/2007 | Linden |
| 7,277,784 B2 | 10/2007 | Weiss |
| 7,398,137 B2 | 7/2008 | Ferguson et al. |
| 2005/0197175 A1* | 9/2005 | Anderson ............ 460/1 |
| 2006/0229804 A1 | 10/2006 | Schmidt et al. |
| 2007/0037621 A1 | 2/2007 | Isfort |
| 2008/0059007 A1 | 3/2008 | Whittaker et al. |
| 2009/0306835 A1 | 12/2009 | Ellermann et al. |

* cited by examiner

SYSTEM AND METHOD FOR TRAJECTORY CONTROL OF A TRANSPORT VEHICLE USED WITH A HARVESTER

CROSS-REFERENCE TO RELATED APPLICATIONS

This application claims the benefit of U.S. Provisional Application No. 61/444,495, entitled "SYSTEM AND METHOD FOR TRAJECTORY CONTROL OF A TRANSPORT VEHICLE USED WITH A HARVESTER," filed Feb. 18, 2011, which application is hereby incorporated by reference in its entirety.

BACKGROUND

The present application relates generally to a system and method for coordinating the operation of a transport vehicle and a harvester engaging in an "unload on the go" operation. The present application relates more specifically to a control system and method to control the trajectory of the transport vehicle relative to the harvester during an "unload on the go" operation.

Harvesters or harvesting machines pick up crop material, treat the crop material, e.g., remove any undesirable portions or residue, and discharge the crop material. Harvesters can discharge the crop material, either continuously as with a forage harvester or after intermediate storage as with a combine harvester, to a transport or transfer vehicle. The transport vehicle may be a tractor or truck pulling a cart, wagon, or trailer, or a truck or other vehicle capable of transporting harvested crop material. The harvested crop material is loaded into the transport vehicle via a crop discharging or unloading device, such as a spout or discharge auger, associated with the harvester.

During "unload on the go" operation of the harvester, the harvested crop material is transferred from the harvester to the transport vehicle while both vehicles are moving. The transport vehicle can travel next to and/or behind the harvester during unload on the go operation. Unload on the go operation is required for a forage harvester, since the forage harvester constantly discharges the harvested crop material. While unload on the go operation is not required for a combine harvester due to the combine harvester's intermediate storage capability, unload on the go operation is commonly used for a combine harvester to maximize the operating efficiency of the combine harvester.

To effectively implement unload on the go operation, the operation of the harvester and transport vehicle is coordinated to maintain the relative distance between the harvester and transport vehicle within an acceptable range. By maintaining the relative distance of the harvester and transport vehicle within an acceptable range, the position and orientation of the harvester unload spout and the position of the transport vehicle, specifically the portion of the transport vehicle receiving crop material, relative to the harvester unload spout position are maintained within an acceptable distance range to permit harvester unload on the go operation, i.e., the discharged crop material can be provided into the transport vehicle without loss to the ground. In other words, discharged crop material is directed to collect in the transport vehicle and is substantially prevented from being misdirected to miss the transport vehicle and collecting on the ground resulting in waste or loss of crop material. In order to maintain an acceptable distance range between the harvester and the transport vehicle, both the lateral (side to side) distance and longitudinal (fore and aft) distance between the harvester and transport vehicle have to be maintained within acceptable ranges.

Some control systems used for unload on the go operations can determine the position of the transport vehicle as a function of the harvester position plus one or more predetermined offsets. While this type of control system can be effective when the harvester travels in a straight line, unacceptable distance deviations may occur when the harvester changes position abruptly and the control system cannot adjust the position of the transport vehicle quickly enough to avoid crop material loss.

Therefore, what is needed is a system and method to control the trajectory of a transport vehicle during an unload on the go operation to prevent unacceptable distance deviations between the transport vehicle and the harvester.

SUMMARY

The present application is directed to a system and method for controlling the trajectory of a transport vehicle to follow the trajectory of a harvester during an unload on the go operation.

The present invention is directed to a method for controlling a trajectory of a transport vehicle during an unload on the go operation with a harvester. The method includes operating a harvester along an unknown travel path, measuring a position and velocity for the harvester, measuring a position and velocity for the transport vehicle, and determining an unload tube position for the harvester. The method further includes calculating future waypoints for the harvester using the measured position and velocity for the harvester and calculating a trajectory for a transport vehicle using the calculated future waypoints, the determined unload tube position, the measured position and velocity of the transport vehicle and the measured position and velocity of the harvester. The method also includes controlling the transport vehicle to follow the calculated trajectory with commands from a controller.

The method can also include measuring a yaw rate for the harvester and calculating future waypoints for the harvester using the measured position and velocity and yaw rate for the harvester. The unload tube position can be defined in terms of the lateral offset distance and longitudinal offset distance from the distal end of the unload tube to the measured position of the harvester.

The present invention is further directed to a control system to control a trajectory of a transport vehicle during an unload on the go operation with a harvester. The control system includes a first global positioning system device to determine a position and velocity of a harvester and a second global positioning system device to determine a position and velocity of a transport vehicle. The control system also includes a configurable parameter corresponding to a dimensional configuration of an unload tube. The configurable parameter is used to determine a position of the unload tube for the harvester. The control system further includes a first controller with a microprocessor to execute a first computer program to calculate a plurality of predicted future waypoints for the harvester using the position and velocity of the harvester from the first global positioning system device and a harvester yaw rate. The control system also includes a second controller with a microprocessor to execute a second computer program to calculate a trajectory for the transport vehicle using the position and velocity of the harvester from the first global positioning system device, the position and velocity of the transport vehicle from the second global positioning system device, the determined unload tube position, and the plurality of predicted future waypoints from the first controller.

The control system also includes a yaw rate sensor to determine a yaw rate, i.e., an angular velocity of turning, of a harvester. The configurable parameter has a value that can be adjusted for different unload tube dimensions such as different unload tube lengths, etc.

The present invention is also directed to a method for calculating predicted future waypoints for a harvester having an unknown travel path. The method includes receiving a global positioning system position, a global positioning system velocity and a yaw rate for a harvester and calculating a predicted path for the harvester using the received global positioning system position, global positioning system velocity and yaw rate. The method further includes receiving a predetermine distance interval and a predetermined number of waypoints and calculating predicted future waypoints for the harvester using the calculated predicted path, the predetermined distance interval and the predetermined number of waypoints.

The present invention is additionally directed to a system to generate predicted future position waypoints for a harvester having an unknown travel path. The system includes a global positioning system device to determine a position and velocity of a harvester, a plurality of sensors and a waypoint calculation unit. The plurality of sensors are operational to measure operating parameters of the harvester. The waypoint calculation unit is in communication with the global positioning system device to receive the determined harvester position and velocity and being in communication with the plurality of sensors to receive the measured operating parameters of the harvester. In addition, the waypoint calculation unit is operational to generate a plurality of predicted future position waypoints for the harvester using the determined harvester position and velocity and the measured operating parameters of the harvester.

One embodiment of the present application relates to a method for controlling the trajectory of a transport vehicle during an unload on the go operation with a harvester. The method includes determining future position waypoints for a harvester trajectory and determining an unload tube position for the harvester, determining a global positioning system position and velocity for the transport vehicle and a global positioning system position and velocity for the harvester. The method also includes calculating a trajectory for the transport vehicle using the future position waypoints for a harvester trajectory, the unload tube position for the harvester, the global positioning system position and velocity for the harvester, and the global positioning system position and velocity for the transport vehicle. The method further includes providing the calculated trajectory to a controller for the transport vehicle and controlling the transport vehicle to follow the calculated trajectory with commands from the controller.

One advantage of the present application is the ability to permit more farmers to perform unload on the go operations as a result of the coordinated control of the transport vehicle and the harvester which reduces the level of skill required for the operator of the transport vehicle.

Other features and advantages of the present application will be apparent from the following more detailed description of the exemplary embodiments, taken in conjunction with the accompanying drawings.

BRIEF DESCRIPTION OF THE FIGURES

Wherever possible, the same reference numbers will be used throughout the drawings to refer to the same or like parts.

DETAILED DESCRIPTION OF THE EXEMPLARY EMBODIMENTS

In the present application, a vehicle to vehicle (V2V) operation refers to an unload on the go operation, and a V2V combine and a V2V tractor refer to a harvester and transport vehicle performing the unload on the go operation.

Figure 1:
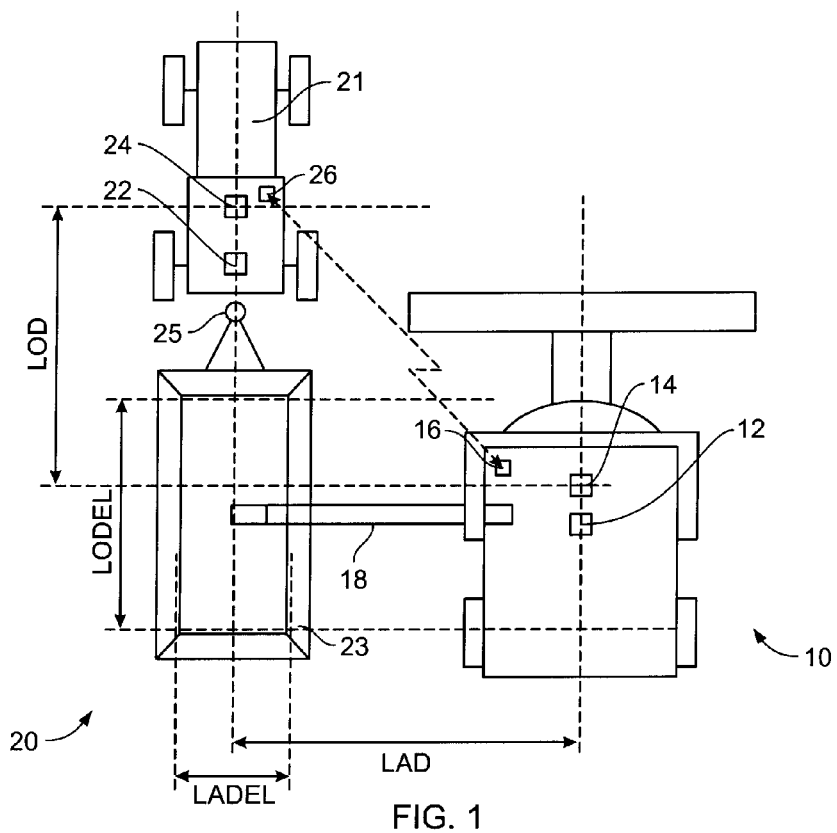
FIG. 1 shows a schematic top view of an embodiment of a harvester and transport vehicle during unload on the go operation.
Figure 2:
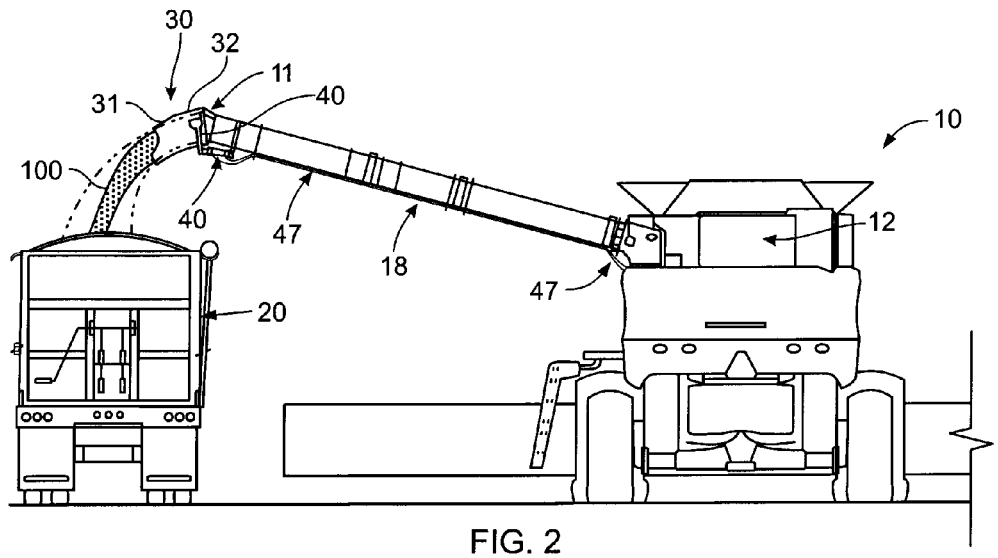
FIG. 2 shows a rear view of an embodiment of a harvester and transport vehicle during unload on the go operation.

FIGS. 1 and 2 show the relative positions of a harvester 10 and transport vehicle 20 during an unload on the go or V2V operation. In one exemplary embodiment, one or both of the harvester or V2V combine 10 and the transport vehicle or V2V tractor 20 can be controlled by a global positioning system (GPS) based auto-guidance control system(s) in order to maintain a desired lateral distance (LAD) and a desired longitudinal distance (LOD) between the harvester 10 and the transport vehicle 20.

An exemplary embodiment of the reference points used for measuring the desired or target lateral distance and the desired or target longitudinal distance is shown in FIG. 1. However, any suitable reference points for measuring lateral distance and longitudinal distance can be used. The desired lateral distance and desired longitudinal distance can both be a preselected distance plus or minus a predetermined offset that ensures that crop material discharged from the harvester 10 is received and stored by the transport vehicle 20. As shown in FIG. 1, the lateral distance error limits (LADEL), together with the desired lateral distance (LAD), define the maximum and minimum lateral distances that can be used for an unload on the go operation. The defined maximum and minimum lateral distances can be the LAD plus and minus one half of the LADEL range. As further shown in FIG. 1, the longitudinal distance error limits (LODEL), together with the desired longitudinal distance (LOD), similarly define the maximum and minimum longitudinal distances that can be used for unload on the go operation. The preselected or desired lateral and longitudinal distances and the corresponding predetermined offsets can be related to the particular harvesters and transport vehicles being used, specifically the distance from the distal end of the harvester unload spout to the centerline of the harvester, the size of the storage area in the transport vehicle and an estimate of the shoot-out distance of the crop material from the harvester unload spout to the transport vehicle.

The harvester 10 can have: a controller 12 that includes a display unit or user interface and a navigation controller; a GPS device 14 that includes an antenna and receiver; and a wireless communication unit or device (WCU) 16 that includes a power control switch. Similarly, the transport vehicle 20 can have: a controller 22 that includes a display unit or user interface, a navigation controller and a tractor vehicle control unit (TV2V); a GPS device 24 that includes an antenna and receiver; and a wireless communication unit or device (WCU) 26 that includes a power control switch. The controllers can be used to control operation and/or steering and/or speed of the harvester 10 and/or the transport vehicle 20, regardless of the machine in which the controller may be installed. The GPS device can be used to determine the position of the harvester 10 or transport vehicle 20 and the wireless communication device can be used to send and receive information, data and control signals between the harvester 10 and the transport vehicle 20. In one embodiment, an additional GPS antenna may be positioned on the receiving area of the transport vehicle, e.g., a grain cart. In another embodiment, the TV2V control unit can execute one or more computer programs to operate a longitudinal position control system for the transport vehicle. The TV2V control unit can also be integrated into a GPS based auto-guidance control system.

In the exemplary embodiment shown in FIG. 1, the transport vehicle 20 can include a traction device 21 and a loading receptacle 23. A hitch angle sensor 25 can be used to determine the relative angle or hitch angle between the traction device 21 and the loading receptacle 23. As shown in FIG. 1, the traction device 21 can be a tractor and the loading receptacle 23 can be a wagon or grain cart. However, in other embodiments, the traction device 21 may be a truck or other self-propelled vehicle sufficient to transport the loading receptacle 23 and the loading receptacle 23 may be a bin or other similar storage/transport vehicle. In another embodiment, the transport vehicle 20 may be a truck, semi-trailer truck, tractor-trailer or other similar self-propelled container vehicle.

Referring now to FIG. 2, the harvester 10 has an unloading tube or spout 18 transversely extending and fully deployed as it unloads crop material 100 through a discharge boot 30 and into the transport vehicle 20. The boot 30 can have any convenient and suitable shape. In one exemplary embodiment, the boot 30 can be generally cylindrical, but can be more boxy with edges, or venturi-shaped, etc. The opening of the unloading tube or spout 18 at its distal end is peripherally sealed by a joint member 11 which hingedly engages a portion 32 of the boot 30, which portion 32 interfaces the distal end of the unloading tube or spout 18. The joint member 11 can be rounded or spherical, but can also be cylindrical on a horizontal axis, as long as the interface between the tube or spout 18 and the boot 30 is adequately sealed. Angularly extending from the portion 32 of the boot 30 is a spout end 31 of the boot 30. Signals from the controller 12 of the harvester 10, travel through conduits 47 for controlling the actuators 40, which actuators 40 can pivotally move the boot 30 up and down and back and forth in hinging relationship to the unloading tube or spout 18, via the spherical joint 11. The joint 11 also serves to seal the interface at the portion 32 of the boot 30.

The controllers 12, 22 can include a microprocessor, a non-volatile memory, an interface board, an analog to digital (A/D) converter, and a digital to analog (D/A) converter to control operation of the harvester 10 and/or transport vehicle 20. The controllers 12, 22 can execute one or more control algorithms to control operation, guidance and/or steering of the harvester 10 and/or transport vehicle 20, to control the speed of the transport vehicle 20 and/or the harvester 10, and to implement harvester spout control. In one embodiment, the control algorithm(s) can be computer programs or software stored in the non-volatile memory of the controllers 12, 22 and can include a series of instructions executable by the corresponding microprocessor of the controllers 12, 22. While it is preferred that the control algorithm be embodied in a computer program(s) and executed by the microprocessor, it is to be understood that the control algorithm may be implemented and executed using digital and/or analog hardware by those skilled in the art. If hardware is used to execute the control algorithm, the corresponding configuration of the controllers 12, 22 can be changed to incorporate the necessary components and to remove any components that may no longer be required.

Further, the controllers 12, 22 can be connected to or incorporate a display unit or user interface that permits an operator of the harvester 10 or transport vehicle 20 to interact with the controllers 12, 22. The operator can select and enter commands for the controllers 12, 22 through the display unit or user interface. In addition, the display unit or user interface can display messages and information from the controllers 12, 22 regarding the operational status of the harvester 10 and/or the transport vehicle 20. The display units or user interfaces can be located locally to the controllers 12, 22, or alternatively, the display units or user interfaces can be located remotely from the controllers 12, 22. In another exemplary embodiment, the controllers 12, 22 can each include one or more subcontrollers under the control of a master controller. Each subcontroller and the master controller can be configured similar to the controllers 12, 22.

In one exemplary embodiment, the controllers 12, 22 can execute a trajectory control system that can automatically steer a transport vehicle 20 to follow the travel path and trajectory of a harvester during unload on the go operations. The trajectory control system can steer the transport vehicle 20 in a controlled manner during unload on the go operations to maintain the lateral and longitudinal distances between the transport vehicle 20 and harvester 10 within the specified distance error limits. In order to steer the transport vehicle 20, the trajectory control system can provide control signals to a steering control valve to adjust the steering position of the transport vehicle 20 (and ultimately the path of the transport vehicle 20) and receive signals from a steering sensor to determine the current steering position of the transport vehicle 20.

The WCUs 16, 26 on the harvester 10 and transport vehicle 20 provide wireless communications between the two vehicles. The harvester controller 12 can wirelessly send sensor information and data on the harvester's future position waypoints to the transport vehicle 20 to inform and notify the transport vehicle 20 of the harvester's current status. The transport vehicle controller 22 can receive data on the harvester's future position waypoints, and generate a trajectory for the transport vehicle 20 which is parallel to the harvester trajectory by the required lateral distance or lateral offset parameter. The transport vehicle's navigation controller, such as a GPS based auto-guidance controller, which can be part of the controller 22, then controls the automated steering of the transport vehicle 20 to follow the generated trajectory for the transport vehicle 20 and, therefore, maintain a required lateral distance between the harvester 10 and the transport vehicle 20.

The trajectory control system can receive some or all of the following information or data from the harvester 10: future position waypoints (i.e., points on the map) on the trajectory or path for the harvester 10; the current GPS position and velocity for the harvester 10; the unload tube end relative position, i.e., lateral offset and longitudinal offset of the unload tube end, with respect to the harvester GPS position; and harvester sensor information, e.g., current harvester speed (wheel speed or ground speed), harvester steering angle, harvester brake position and harvester throttle position. In one exemplary embodiment, the trajectory control system does not require information on future position waypoint speed and time, which can permit manual speed control of the harvester 10 by the operator.

The trajectory control system can then build a desired transport vehicle trajectory based on the harvester future position waypoints, the unload tube position, the current harvester GPS position and velocity, and the current transport vehicle GPS position and velocity. The desired transport vehicle trajectory is sent to the transport vehicle's navigation controller in order to control the lateral position of the transport vehicle 20 with respect to the harvester 10. The trajectory control system may also control the transport vehicle speed in order to follow the harvester 10 in the correct longitudinal position to permit the unloading of crop material into the transport vehicle 20. The trajectory control system may use the harvester speed information to assist with the transport vehicle speed control. If the harvester's actual travel path, recorded by GPS position signal, deviates from the last-time predicted path by a predetermined deviation value during an unload on the go operation, which predetermined deviation value can cause the distance between the harvester 10 and transport vehicle 20 to be close to or over the error limits, LADEL and/or LODEL, the trajectory control system gives a warning to the transport vehicle driver and the automatic operations are suspended, i.e., control of the transport vehicle 20 is returned to the transport vehicle operator, and a safe mode of operation is entered for the harvester 10 and transport vehicle 20. A large deviation of the actual harvester travel path from the last-time predicted path can happen when a harvester operator quickly changes the harvester steering angle by a large value. In the safe mode of operation, the harvester discharge auger is stopped and the transport vehicle 20 and/or harvester 10 is slowed down. In another exemplary embodiment, safe mode of operation may be entered when the wireless communication between the harvester 10 and the transport vehicle 20 is not working properly or when the GPS signal is not reliable.

Figure 3:
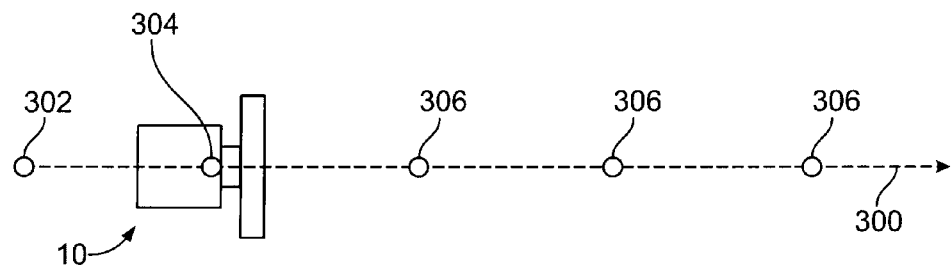
FIGS. 3 and 4 show embodiments of harvester trajectories with waypoints.
Figure 4:
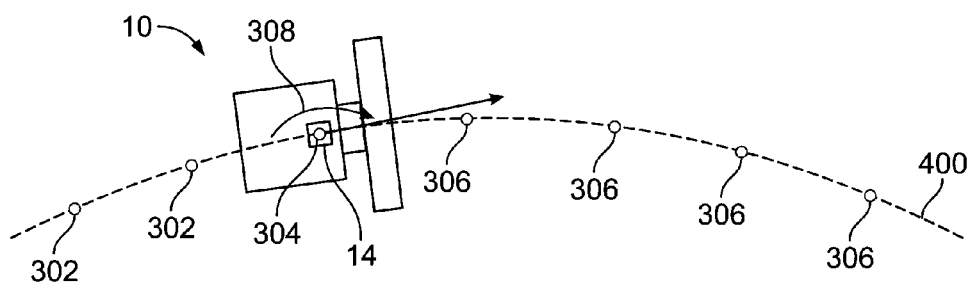

FIGS. 3 and 4 show embodiments of different harvester trajectories. FIG. 3 shows a substantially straight harvester trajectory or path 300 and FIG. 4 shows a curved harvester trajectory or path 400. For the curved harvester trajectory or path 400, the yaw rate 308 of the harvester 10 can be determined or measured, and a harvester turning radius can be calculated as a ratio of the harvester velocity to the yaw rate. Each of the harvester trajectories or paths 300, 400 can include previous waypoints 302, i.e., waypoints already passed or crossed by the harvester 10, the current harvester position 304, and future position waypoints 306. The future position waypoints 306 on the harvester trajectory or path 300, 400 can be evenly or unevenly spaced along the harvester trajectory. In addition, the future position waypoints 306 may be determined in relation to the size of the area in which the harvester 10 is operating.

In one embodiment, the future position waypoints 306 on the harvester trajectory are known in advance with some certainty. The future position waypoints 306 for the harvester 10 can be known in advance from a known harvester trajectory being used with an autoguidance control of the harvester 10.

In another embodiment, the future position waypoints on the harvester trajectory have to be calculated because the harvester trajectory may not be known with any certainty. The future position waypoints on the harvester trajectory may not be known when manual control and steering of the harvester 10 is being performed by the operator. In an exemplary embodiment, when one master combine harvester and one or more slave combine harvesters work in tandem, the master combine harvester may be manually steered by an operator without a certain trajectory, and each of the slave combine harvesters follows the master combine harvester one after another by auto-steering using a GPS based auto-guidance system and using wireless communication links between the master and slaves. When a transport vehicle and a slave combine harvester perform an unload on the go operation, although the slave combine harvester is automatically steered by a GPS based auto-guidance system, the future position waypoints for the trajectory of the slave combine is unknown and is dependent on how the operator of the master combine harvester will manually steer the harvester during operation.

Figure 5:
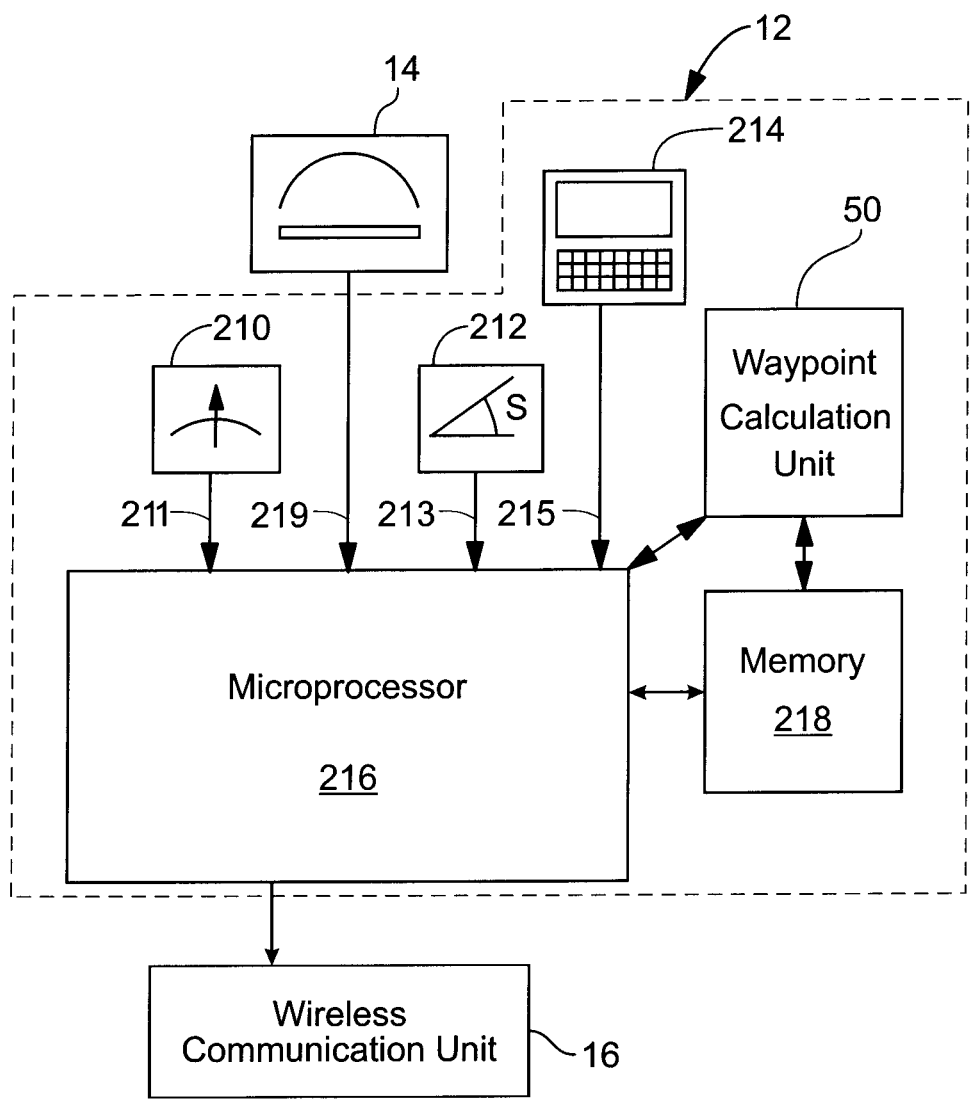
FIG. 5 shows schematically an embodiment of a controller for a harvester.

FIG. 5 shows an embodiment of a controller for a harvester. The controller 12 can be located on or in the harvester 10 and can simplify the task of operating the harvester 10. The controller 12 can be communicatively connected to the GPS receiver 14 and the wireless communication unit 16. The control functions, control algorithms or control system provided by the controller 12 can be provided by software instructions executed by the microprocessor 216 or other microprocessors incorporated into the controller 12.

The controller 12 can include a yaw rate sensor 210, a steering angle sensor 212, an operator input device 214, one or more microprocessors 216, and one or more digital memory circuits or memory devices 218. The yaw rate sensor 210, steering angle sensor 212, operator input device or user interface 214 and digital memory 218 are communicatively coupled to the microprocessor 216. The microprocessor 216 is communicatively coupled to the wireless communication unit 16.

The yaw rate sensor 210 provides or sends a continual or digital yaw rate signal 211 to the microprocessor 216, telling the microprocessor the rate at which the harvester 10 is changing its heading. The yaw rate sensor 210 may be a MEMS (microelectromechanial system) gyroscope, a laser gyroscope or other rate gyroscope. Alternatively, the vehicle yaw rate sensor 210 may be a microprocessor circuit programmed to calculate the yaw rate from incoming signals or estimated or calculated values.

The steering angle sensor 212 sends or provides a continual steering angle signal 213 to the microprocessor 216. The steering angle signal 213 tells the microprocessor the current angle of the steerable wheels of the harvester 10. The steering angle sensor 212 may be an encoder mounted on the harvester 10, or may be a microprocessor circuit programmed to calculate steering angle based upon incoming signals and values stored in the digital memory 218. Alternatively, the steering angle sensor may include a Hall effect device, potentiometer, variable resistor, linear position transducer, or any other sensor in or on the steering actuator, the wheel, the wheel hub, or steering joint that senses wheel steering or relative movement or position of the wheel with respect to another part of the vehicle, such as wheel rotation about a steering kingpin, or alternatively senses the displacement or movement of the steering actuator or other linkage coupled thereto.

The operator input device or user interface 214 can be configured to receive information relating to the harvester 10 and to provide a signal 215 with the information to the microprocessor 216. Data entered by the operator on the input device 214 can be stored in the digital memory 218 by the microprocessor 216. The operator input device 214 can be mounted inside the operator compartment of the harvester 10, to be easily accessible to the operator. The operator input device 214 can include a display and a keyboard. The microprocessor 216 can receive process variables from the keyboard or other sensors, and can display the current status of the harvester (location, direction, etc.) on the display.

The GPS receiver 14 continually receives information about the absolute position and velocity of the harvester 10 and forwards a vehicle position and velocity signal 219 to the microprocessor 216 that indicates this absolute position and velocity. The GPS receiver 14 can be part of a satellite navigation system mounted on the outside of the harvester 10, with a clear line of sight to the satellites. Alternatively, the GPS receiver 14 may include an antenna mounted outside the harvester 10, while the receiver is mounted inside the harvester 10. Alternatives to the GPS receiver 14 can include differential global positioning systems (DGPS), land-based position receivers or dual-frequency real time kinematics (RTK) receivers. In one embodiment, a digital low pass filter can be programmed for the microprocessor 216 in order to process the received velocity signal 219 to reduce signal noise. The low pass filter program can be stored in the digital memory 218.

The digital memory 218 stores microprocessor instructions and data. The instructions configure the microprocessor 216 to perform various functions. The memory also stores process data calculated or estimated by the microprocessor 216 and/or entered by the operator using the operator input device 214. In addition, the controller can include a waypoint calculation unit 50 that can calculate or predict future position waypoints for the harvester based on harvester operating information. In one embodiment, the waypoint calculation unit 50 can include one or more microprocessors and memory devices to execute the corresponding computer algorithms to calculate the predicted future waypoints. In another embodiment, the waypoint calculation unit 50 can use one or both of the microprocessor 216 or memory device 218 to execute the corresponding computer algorithms to calculate the predicted future position waypoints.

Figure 6:
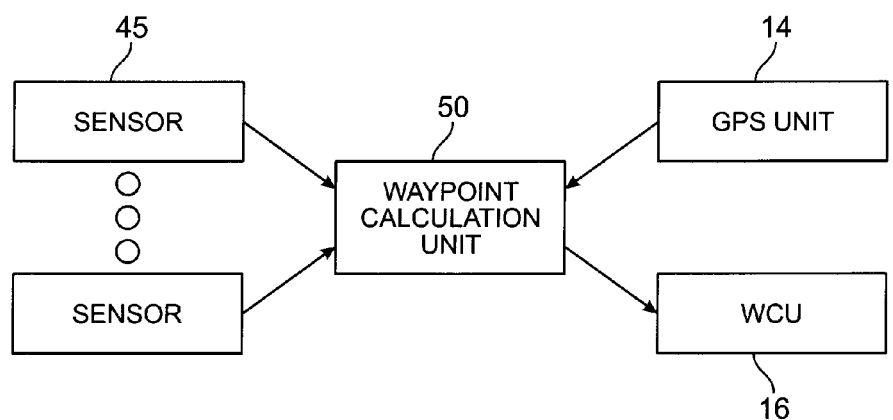
FIG. 6 shows schematically an embodiment of a system for calculating waypoints of a harvester.

FIG. 6 shows a system for predicting future position waypoints for a harvester. The system can include the waypoint calculation unit or elaboration unit 50, which can receive inputs from sensors 45 and GPS receiver or unit 14 and provide information, such as the predicted future position waypoints, to the WCU 16 for transmission to transport vehicle 20. In one embodiment, the waypoint calculation unit 50 can receive signals from harvester sensors relating to some or all of the following: wheel speed and heading; yaw rate; steering angle; brake position; and throttle position, and estimate the future position waypoints using the received signals. The waypoint calculation unit 50 uses a model based waypoint computation/estimation to determine future position waypoints on the harvester trajectory when the future position waypoints are not readily known, such as when the harvester is being manually operated. In one exemplary embodiment, the controller 22 of the transport vehicle 20 can estimate the harvester's future position waypoints.

In another exemplary embodiment, the waypoint calculation unit 50 can calculate a predicted harvester path, such as the curved harvester path 400 in FIG. 4, with a kinematic model waypoints calculation method using the harvester's position and velocity signals from a harvester GPS device 14 and using the harvester's yaw rate signal 211, or turning angular velocity signal, from a harvester yaw rate sensor 210. A basic relationship for the velocity, yaw rate and turning radius of a harvester 10 travelling a curved path is: Velocity=turning radius×yaw rate. Besides curved paths, this basic relationship also applies to straight paths, such as the straight harvester path 300 in FIG. 3. When a harvester travels in a straight path, its velocity is non-zero but the measured yaw rate is zero or around zero so that the turning radius from the basic relationship equation approaches to infinity. A turning radius of an infinity value represents a straight line. In another exemplary embodiment, a predicted harvester path is a straight path in the direction of the harvester velocity when a calculated turning radius for the harvester is greater than a predetermined number, such as 3,000 meters. In another embodiment, additional information on the sideslip of a harvester can be used to improve the accuracy of the calculated turning radius.

A turning radius of the harvester 10 can be calculated with the measured harvester velocity and yaw rate 308 using the equation above. A predicted harvester path based on the current harvester GPS position 304 can be generated as an arc, as shown in FIG. 4. The predicted arc path for the harvester 10 can have a radius being equal to the calculated turning radius, can pass through the current harvester GPS position 304, and can be tangent to the current harvester velocity direction. The direction of the yaw rate 308 can determine whether the arc for the harvester 10 is turning towards the left or turning towards the right. For example, a positive yaw rate represents a right turn of the harvester and a negative yaw rate represents a left turn of the harvester.

Predicted future position waypoints 306 for the harvester 10 are calculated based on the predicted harvester path, a predetermined distance interval between two adjacent waypoints and a predetermined number of waypoints for each predicted path. In one embodiment, the predetermined distance interval can be based on the speed the harvester 10 is operating or the minimum turning radius of the harvester 10. Predicted future position waypoints 306 can be updated once every predetermined time step when the harvester 10 is moving. When the harvester 10 is not moving, predicted future position waypoints 306 of the last time step remain valid, without an update, as long as the harvester 10 has not moved from the predicted path.

Figure 7:
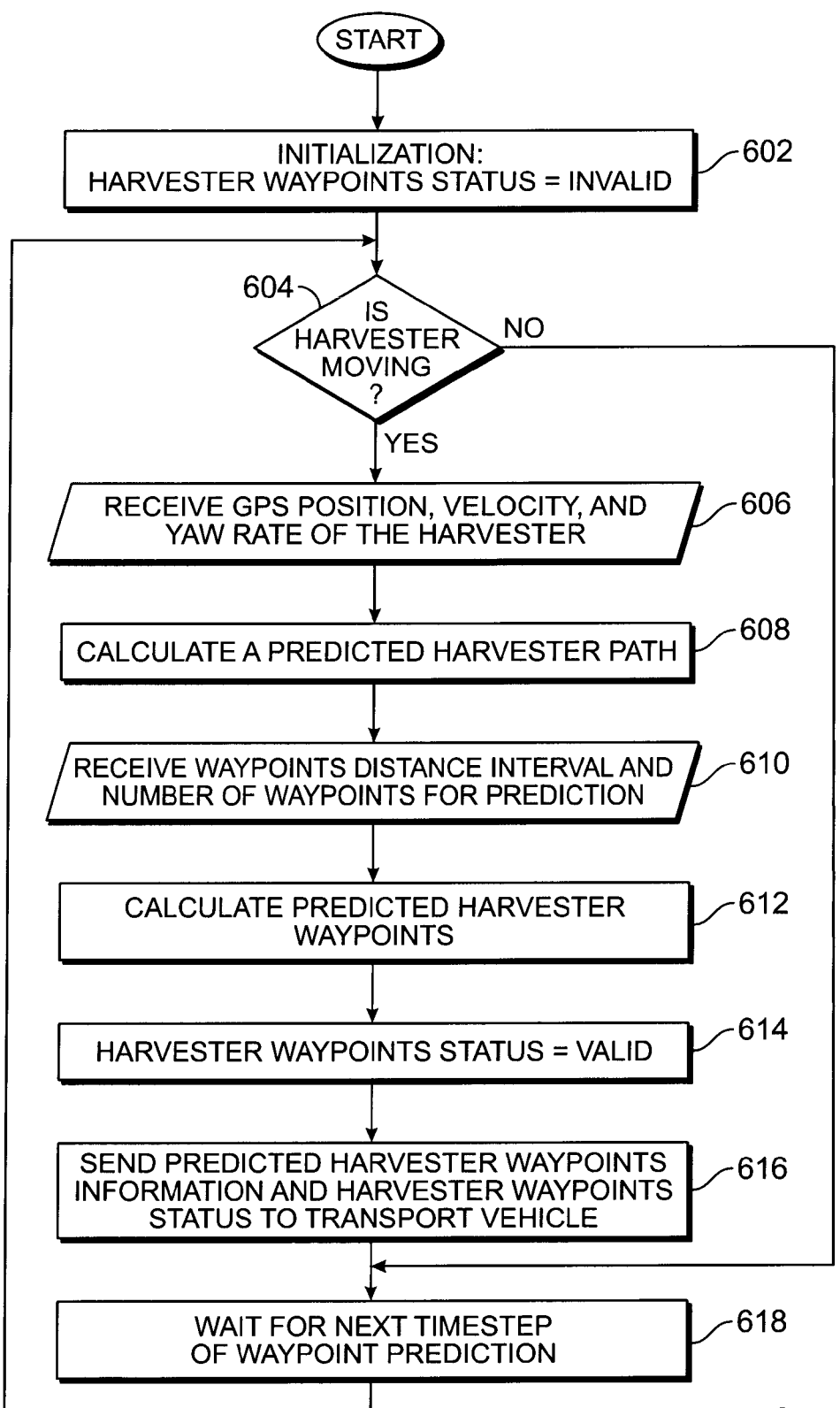
FIG. 7 shows a flow chart of an embodiment of a process to calculate waypoints for a harvester.

FIG. 7 shows a flow chart of an exemplary embodiment of the kinematic model waypoints calculation process executed by a controller or waypoint calculation unit. At the start of the process, the controller or unit is initialized and the harvester waypoints status is preset to invalid (step 602). The harvester waypoints status can be used to indicate if the harvester future waypoints data stored in the computer memory of the controller is valid for trajectory control. Next, a determination is made as to whether the harvester is moving or not (step 604). If the harvester is not moving, the process waits for the next time step (step 618) before restarting with a determination on whether the harvester is moving. In one embodiment, a predetermined time step for the waypoints calculation process can be once every second. In another embodiment, the update rate (or predetermined time step) of predicted harvester waypoints can be limited by the update rate of the GPS device signal, i.e., how fast the new GPS signals are available. One example of an update rate of GPS device output signal can be a new value of the signal is generated every 200 milliseconds. In a further embodiment, the update rate of predicted harvester waypoints can be limited by how fast the GPS based auto-guidance control system for the transport vehicle can accept updated guidance control waypoints. For example, the transport vehicle auto-guidance control system can update guidance control waypoints once per a time period of at least one second which means that the time step for the waypoints calculation process should also be at least one second.

Longer update rates for the predicted harvester waypoints should be avoided. The longer the time between two updates, the larger a deviation, or prediction error, can be between the last-time predicted harvester path and the actual harvester path if the harvester steering angle changes by a manual operation during the time period between the two updates. Within each time step for future waypoints calculation, there can be multiple time steps for multiple updates of GPS and other sensor signals as well as transport vehicle auto steering control signals to control the transport vehicle to follow the calculated transport vehicle trajectory towards zero error. In one embodiment, the time step for future waypoints calculation can be one second, the time step for GPS device signal can be 0.2 second, and the time step for steering angle sensor signal and steering control signal can be 0.01 second.

If the harvester 10 is determined to be moving, the GPS position of the harvester 10, the velocity of the harvester 10 and the yaw rate of the harvester 10 is provided to the controller (step 606). Using the GPS position, velocity and yaw rate, a predicted path for the harvester 10 is calculated (step 608). In an exemplary embodiment, other data or input, e.g., harvester past waypoints (predicted or actual), and harvester steering angle, can be used to calculate the predicted path for the harvester. In one embodiment, the harvester GPS position signal history provides the information of the actual past waypoints of the harvester. The controller can then retrieve or receive information on the distance interval between the waypoints and the number of waypoints to be used (step 610). For example, a distance interval of 4 meters with 6 waypoints can provide a prediction distance horizon of 24 meters and a prediction time horizon of 10.7 seconds under a travel speed of 5 mph. Both the distance interval and the number of waypoints can be stored in the memory of the controller as predetermined values to be used with each predicted path. In one exemplary embodiment, both the distance interval and the number of waypoints can have several predetermined values that can be selected from based on the type of predicted path that is calculated. For example, a first set of predetermined values for the distance interval and number of waypoints can be selected for a straight predicted path, a second set of predetermined values for the distance interval and number of waypoints can be selected for an arc type of predicted path, and a third set of predetermined values for the distance interval and number of waypoints can be selected for a spiral curve type of predicted path. A spiral curve type of predicted path can be calculated when a predicted rate of change in harvester turning radius or turning curvature is used. A predicted rate of change in harvester turning radius can be calculated from data of the harvester GPS position and the ratio of harvester velocity to yaw rate at two time points, the current time and a time shortly before. The predicted rate of change in harvester turning radius also can be calculated from data of the harvester GPS position and the harvester steering angle at two time points, the current time and a time shortly before. A predetermined look-up table for the relationship between the harvester steering angle and harvester turning radius can be used to translate the harvester steering angle data to a harvester turning radius. In another embodiment, both the distance interval and the number of waypoints can have several predetermined values that can be selected based on the travel speed of the harvester 10. The harvester operation speed can be divided into several speed ranges, such as low, medium and high. For each speed range, a corresponding set of predetermined values for the distance interval and number of waypoints can be selected.

Once the distance interval and the number of waypoints are received by the controller or waypoint calculation unit, the predicted waypoints on the predicted path for the harvester are calculated (step 612) and the harvester waypoint status is updated to valid (step 614). The predicted waypoints and the harvester waypoint status are then sent or transmitted to the transport vehicle 20 (step 616) by the wireless communication unit. In one exemplary embodiment, the predicted harvester waypoints information sent to a transport vehicle 20 can include the GPS coordinates of the predicted future waypoints, the GPS coordinates of the current harvester position, the unload tube position, the type of predicted harvester path (straight, arc, or spiral), and the harvester velocity. Afterwards, the control waits for the next time step (step 618) to repeat the process again based on a predetermined time step for the waypoints calculation process.

The controller 22 for the transport vehicle 20 can use the information from the harvester 10 on the type of predicted path, the unload tube position for the harvester 10, the current position and velocity for the harvester 10 and the predicted future waypoints, in addition to the information from the transport vehicle 20 on the current position and velocity for the transport vehicle 20 to calculate a trajectory or path for the transport vehicle 20 that maintains the appropriate lateral, or parallel, distances between the transport vehicle 20 and the harvester 10. In one embodiment, the transport vehicle 20 can have a trajectory or path based on the predicted path and predicted future waypoints of the harvester 10 plus a desired lateral distance. The desired lateral distance can be based on mainly the lateral offset distance component of the unload tube position relative to the harvester GPS position. The transport vehicle trajectory can be calculated to be parallel to the harvester path by the desired lateral distance and to be the same type as the harvester path, which harvester path is provided by the information on the waypoints and type of the predicted path for the harvester 10. The trajectory waypoints for the transport vehicle 20 can then be calculated based on the calculated transport vehicle trajectory and corresponding interval distance and number of waypoints for the future waypoints of the harvester 10. The information on the current position and velocity for the transport vehicle 20 can be used to calculate a transition path to smoothly guide the transport vehicle 20 from the current position to the calculated trajectory. During unload on the go operations, a GPS based autoguidance control system for the transport vehicle 20 can control the automated steering of the transport vehicle 20 to follow the calculated transport vehicle trajectory to maintain a desired lateral distance from the harvester 10 using the information on the transport vehicle trajectory type and waypoints, and a longitudinal position control system for the transport vehicle 20 can control the speed of the transport vehicle 20 to maintain a desired longitudinal distance from the harvester 10 using the information on the position and velocity of the harvester 10 and the position and velocity of the transport vehicle 20 with the desired longitudinal distance as the control target. In another embodiment, the waypoint calculation unit 50 in the controller 12 for the harvester 10 can calculate the predicted path and waypoints for the harvester 10 and the trajectory and waypoints for the transport vehicle 20 and send the calculated transport vehicle trajectory waypoints information to the transport vehicle 20.

In an exemplary embodiment, the wireless communications between the harvester 10 and the transport vehicle 20 can be controller area network (CAN) messages.

In an exemplary embodiment, the harvester 10 can operate as a "master" vehicle and the transport vehicle 20 can be the "slave" vehicle whose control is dependent on the "master" vehicle. However, in another embodiment, the transport vehicle 20 can operate as the "master" vehicle and the harvester 10 can be the "slave" vehicle.

In an exemplary embodiment, the unload on the go operation and the trajectory control operation are suspended in a safe mode when the wireless communication is not working or when the GPS signal is not reliable. In the safe mode the unload on the go operation is stopped and the tractor or transport vehicle slows down.

It should be understood that the application is not limited to the details or methodology set forth in the following description or illustrated in the figures. It should also be understood that the phraseology and terminology employed herein is for the purpose of description only and should not be regarded as limiting.

The present application contemplates methods, systems and program products on any machine-readable media for accomplishing its operations. The embodiments of the present application may be implemented using existing computer processors, or by a special purpose computer processor for an appropriate system, or by a hardwired system.

Embodiments within the scope of the present application include program products comprising machine-readable media for carrying or having machine-executable instructions or data structures stored thereon. Machine-readable media can be any available non-transitory media that can be accessed by a general purpose or special purpose computer or other machine with a processor. By way of example, machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Likewise, software implementations could be accomplished with standard programming techniques with rule based logic and other logic to accomplish the various connection steps, processing steps, comparison steps and decision steps.

In the further consideration of the drawings of this application and the discussion of such drawings and the elements shown therein, it should also be understood and appreciated that, for purposes of clarity in the drawings, pluralities of generally like elements positioned near to one another or extending along some distance may sometimes, if not often, be depicted as one or more representative elements with extended phantom lines indicating the general extent of such like elements. In such instances, the various elements so represented may generally be considered to be generally like the representative element depicted and generally operable in a like manner and for a like purpose as the representative element depicted.

Many of the fastening or connection processes and components utilized in the application are widely known and used, and their exact nature or type is not necessary for an understanding of the application by a person skilled in the art. Also, any reference herein to the terms "left" or "right" is used as a matter of mere convenience, and is determined by standing at the rear of the machine facing in its normal direction of travel. Furthermore, the various components shown or described herein for any specific embodiment in the application can be varied or altered as anticipated by the application and the practice of a specific embodiment of any element may already be widely known or used by persons skilled in the art.

It will be understood that changes in the details, materials, steps and arrangements of parts which have been described and illustrated to explain the nature of the application will occur to and may be made by those skilled in the art upon a reading of this disclosure within the principles and scope of the application. The foregoing description illustrates an exemplary embodiment of the invention; however, concepts, as based upon the description, may be employed in other embodiments without departing from the scope of the application.

While the application has been described with reference to an exemplary embodiment, it will be understood by those skilled in the art that various changes may be made and equivalents may be substituted for elements thereof without departing from the scope of the application. In addition, many modifications may be made to adapt a particular situation or material to the teachings of the application without departing from the essential scope thereof. Therefore, it is intended that the application not be limited to the particular embodiment disclosed as the best mode contemplated for carrying out this application, but that the invention will include all embodiments falling within the scope of the appended claims.

What is claimed is:

1. A method for controlling a trajectory of a transport vehicle during an unload while travelling operation with a harvester, the method comprising:
    operating a harvester along an unknown travel path;
    measuring a position and velocity for the harvester with a first global positioning system;
    measuring a position and velocity for the transport vehicle with a second global positioning system;
    determining an unload tube position for the harvester;
    calculating future waypoints for the harvester using the measured position and velocity for the harvester;
    calculating a trajectory for the transport vehicle using the calculated future waypoints, the determined unload tube position, the measured position and velocity of the transport vehicle, and the measured position and velocity of the harvester;
    transmitting the calculated trajectory with commands from a controller to a steering system for the transport vehicle; and
    steering the transport vehicle with the steering system along the calculated trajectory in response to the commands received by the steering system from the controller.

2. The method of claim 1 wherein said calculating future waypoints comprises:
    measuring, a yaw rate for the harvester;
    calculating a predicted path for the harvester using the measured yaw rate and the measured position and velocity for the harvester;
    receiving a predetermine distance interval and a predetermined number of waypoints; and
    calculating the future waypoints using the calculated predicted path, the predetermined distance interval and the predetermined number of waypoints.

3. The method of claim 2 wherein said calculating a predicted path comprises:
    generating an arc passing through a current position for the harvester and being tangent to a current velocity direction for the harvester, the generated arc having a radius corresponding to a calculated turning radius of the harvester and a turning direction defined by a direction of the measured yaw rate; and generating a straight path passing through the current position for the harvester and in the current direction of the velocity of the harvester based on a calculated turning radius of the harvester being greater than a predetermined value.

4. The method of claim 1 further comprising sending the calculated future waypoints, a type of predicted path, the determined unload tube position and the measured position and velocity of the harvester from the harvester to the transport vehicle.

5. The method of claim 1 further comprising performing said measuring a position and velocity for a harvester, said measuring a position and velocity for a transport vehicle, said calculating a predicted path for the harvester, said calculating future waypoints for the harvester, and said calculating a trajectory for a transport vehicle once every predetermined time interval.

6. A control system to control a trajectory of a transport vehicle during an unload while travelling operation with a harvester, the control system comprising:
a first global positioning system device to determine a position and velocity of the harvester;
a second global positioning system device to determine a position and velocity of the transport vehicle;
a configurable parameter corresponding to a dimensional configuration of an unload tube, the configurable parameter being used to determine a position of the unload tube for the harvester;
a first controller comprising a microprocessor to execute a first computer program to calculate a plurality of predicted future waypoints for the harvester using the position and velocity of the harvester from the first global positioning system device and a harvester yaw rate; and
a second controller comprising a microprocessor to execute a second computer program to calculate a trajectory for the transport vehicle using the position and velocity of the harvester from the first global positioning system device, the position and velocity of the transport vehicle from the second global positioning system device, the determined unload tube position and the plurality of predicted future waypoints from the first controller.

7. The control system of claim 6 further comprising:
a first wireless communication device mounted on the harvester; and
a second wireless communication device mounted on the transport vehicle, the second wireless communication device being in communication with the first wireless communication device.

8. The control system of claim 6 wherein the second computer program executed by the second controller calculates the trajectory of the transport vehicle to maintain a predetermined lateral distance from the harvester.

9. The control system of claim 6 further comprising a sensor to measure the yaw rate for the harvester.

10. The control system of claim 6 wherein the first computer program executed by the first controller calculates a predicted path for the harvester using the position and velocity of the harvester from the first global positioning system device and the harvester yaw rate and calculates the plurality of predicted future waypoints using the predicted path, a predetermined waypoint distance interval and a predetermined number of waypoints.

11. A method for calculating predicted future waypoints for a harvester having an unknown travel path and coordinating travel of a vehicle with the harvester, the method comprising:
receiving a global positioning system position, a global positioning system velocity and a yaw rate for a harvester;
calculating a predicted path for the harvester using the received global positioning system position, global positioning system velocity and yaw rate;
receiving a predetermine distance interval and a predetermined number of waypoints;
calculating the predicted future waypoints for the harvester using the calculated predicted path, the predetermined distance interval and the predetermined number of waypoints;
transmitting commands corresponding to the calculated predicted future waypoints for the harvester from a controller to a steering system for the vehicle; and
automatically steering the vehicle with the steering system in response to the commands to coordinate travel of the vehicle with the harvester.

12. The method of claim 11 further comprising setting a harvester waypoints status indicator to invalid.

13. The method of claim 11 further comprising setting a harvester waypoints status indicator to valid upon completing said calculating the predicted future waypoints.

14. The method of claim 13 further comprising sending the harvester waypoints status indicator to the vehicle.

15. The method of claim 11 further comprising:
determining if the harvester is moving; and
performing said receiving a global positioning system position, a velocity and a yaw rate, said calculating a predicted path for the harvester, said receiving a predetermine distance interval and a predetermined number of waypoints and said calculating predicted future waypoints in response to a determination that the harvester is moving.

16. The method of claim 11 further comprising updating said receiving a global positioning system position, a velocity and a yaw rate, said calculating a predicted path for the harvester, said receiving a predetermine distance interval and a predetermined number of waypoints and said calculating predicted future waypoints once every predetermined time interval.

17. A system to generate predicted future position waypoints for a harvester having an unknown travel path, the system comprising:
a global positioning system device to determine a position and velocity of the harvester;
a plurality of sensors, the plurality of sensors being operational to measure operating parameters of the harvester;
a waypoint calculation unit, the waypoint calculation unit being in communication with the global positioning system device to receive the determined harvester position and velocity and being in communication with the plurality of sensors to receive the measured operating parameters of the harvester; and
the waypoint calculation unit being operational to generate a plurality of predicted future position waypoints for the harvester using the determined harvester position and velocity and the measured operating parameters of the harvester.

18. The system of claim 17 further comprising a wireless communication unit in communication with the waypoint calculation unit, the wireless communication unit being operational to receive the generated plurality of predicted future position waypoints and to provide the generated plurality of predicted future position waypoints to a vehicle in coordinated operation with the harvester.

19. The system of claim 17 wherein the measured operating parameters of the harvester comprise at least one of wheel speed, heading, steering angle, yaw rate, brake position or throttle position.

20. The system of claim 17 wherein the waypoint calculation unit comprises a microprocessor to execute a computer algorithm with a kinematic model waypoints calculation method to generate the plurality of predicted future position waypoints.

* * * * *